(12) United States Patent
Stewart, Jr.

(10) Patent No.: US 9,241,452 B2
(45) Date of Patent: Jan. 26, 2016

(54) MULTIPLE POTTED-PLANT SELF-WATERING SYSTEM

(71) Applicant: Donald J. Stewart, Jr., Merced, CA (US)

(72) Inventor: Donald J. Stewart, Jr., Merced, CA (US)

( * ) Notice: Subject to any disclaimer, the term of this patent is extended or adjusted under 35 U.S.C. 154(b) by 222 days.

(21) Appl. No.: 14/082,910

(22) Filed: Nov. 18, 2013

(65) Prior Publication Data

US 2015/0135590 A1    May 21, 2015

(51) Int. Cl.
 *A01G 25/00* (2006.01)
 *A01G 27/06* (2006.01)
 *A01G 27/00* (2006.01)

(52) U.S. Cl.
 CPC .............. *A01G 27/06* (2013.01); *A01G 27/001* (2013.01)

(58) Field of Classification Search
 CPC ... A01G 27/006; A01G 27/00; A01G 27/001; A01G 27/003; A01G 27/005; A01G 27/008; A01G 9/027
 USPC ..................................... 47/40.5, 81
 See application file for complete search history.

(56) References Cited

U.S. PATENT DOCUMENTS

| | | | |
|---|---|---|---|
| 1,450,633 A | 4/1923 | Hudson | |
| 3,739,524 A | 6/1973 | Rose | |
| 3,786,598 A | 1/1974 | Stadelhofer | |
| 4,219,967 A | 9/1980 | Hickerson | |
| 4,287,682 A * | 9/1981 | Browne | A01G 27/04 47/65.8 |
| 4,557,071 A | 12/1985 | Fah | |
| 5,046,282 A | 9/1991 | Whitaker | |
| 5,189,834 A | 3/1993 | Green | |
| 5,535,542 A | 7/1996 | Gardner et al. | |
| 5,921,025 A | 7/1999 | Smith | |
| 6,079,156 A | 6/2000 | Colovic | |
| 6,357,179 B1 | 3/2002 | Buss | |
| 6,370,819 B1 | 4/2002 | Reiss et al. | |
| 6,505,440 B1 | 1/2003 | Lai | |
| 6,622,430 B1 | 9/2003 | Lai | |
| 6,986,224 B2 | 1/2006 | Gelfer | |
| 7,171,783 B1 | 2/2007 | Fidotti | |
| 7,418,799 B1 | 9/2008 | Witt | |
| 7,690,151 B2 | 4/2010 | Wilkes | |
| 8,011,135 B2 | 9/2011 | Masser et al. | |
| 8,347,552 B1 | 1/2013 | Johnson, III | |
| 8,381,441 B2 | 2/2013 | Altendorfer et al. | |
| 2007/0022660 A1 | 2/2007 | Buitendag et al. | |
| 2010/0162624 A1 | 7/2010 | Bradley | |
| 2010/0313474 A1 | 12/2010 | Williams | |
| 2011/0162272 A1 | 7/2011 | Junkeer | |
| 2011/0179708 A1 | 7/2011 | Stewart, Jr. | |
| 2012/0210642 A1 | 8/2012 | Tomas | |

* cited by examiner

*Primary Examiner* — Joshua Huson
(74) *Attorney, Agent, or Firm* — Temmerman Law Office; Mathew J. Temmerman

(57) ABSTRACT

A multiple plant container self-watering system comprises a primary container at a first elevation and a plurality of secondary containers at different elevations, fluidly connected by means of tubing. The primary container comprises a primary outer shell that encloses a primary reservoir pot, having an expanded upper portion and a tubular lower portion, a primary wick and a primary grow pot. Each of the plurality of secondary containers comprises a secondary outer shell that encloses a secondary reservoir pot having an expanded upper portion and a tubular lower portion, a secondary wick, and a secondary grow pot. The diameter of the lower portion of the primary and secondary reservoir pot is greatly reduced in comparison to the diameter of the upper portion thereof, thereby allowing for substantially similar dry-down time for a plurality of fluidly connected plant containers at different elevations.

19 Claims, 6 Drawing Sheets

MULTIPLE POTTED-PLANT SELF-WATERING SYSTEM

BACKGROUND OF THE DISCLOSURE

1. Technical Field of the Disclosure

The present invention is related in general to plant self-watering systems, and in particular to a multiple potted-plant self-watering system that provides a means for fluidly connected pots on a sloped surface to dry down in unison.

2. Description of the Related Art

In the growing and maintenance of small plants and agricultural plantings there is a need to provide water or an applicable nourishing liquid to the root system of a plant in a controlled manner, on a substantially continuous basis, and in correct amounts. This allows the particular plant to feed itself as needed, without the damaging effects of overwatering. The most significant problem in tending to potted plants is watering and feeding them. Generally, the gardener must individually tend to each potted plant, determining when and how much water and food to provide to each plant. Plants of different types may require different amounts of water or water at different intervals. Whether of the same or a different type, plants located in sunny versus shaded areas or located in different types or sizes of pots may all have different levels of water usage. Thus, a gardener may need to tend various plants on an everyday basis, watering and/or feeding different plants on different days. Even this difficult tending process requires the presence of the gardener. Thus, when a homeowner leaves their home for a period of time, such as for a vacation, the homeowner must find another party to tend to the plants or else they may die.

Non-self watering planters often require daily attention to check soil moisture and water as needed. It is also common for under and overwatering to occur when the plants are not checked often enough or if too much water is given. In order to avoid the disadvantages associated with manual watering, various self-watering systems are known in the prior art. In the case of outdoor plants, automated irrigation systems are known. These systems generally utilize pipes to deliver water from a source to a sprinkler head or the like, from which the water is dispensed. A timer may be configured to turn valves on and off, thus controlling the flow of water through the pipes. In other multiple watering systems, such as multiple plant drip systems, each plant generally receives an equal amount of water. Drip systems have developed means to vary the flow rate at each particular drip point. However, they are not very precise. Common drawbacks to drip systems include overly saturated soil, drainage through the bottom of the pot, and under watering.

Typically, a conventional planting pot includes a floor having a centrally located aperture, which serves as a drain hole when the plant has been over watered. Draining through the bottom of the pot is wasteful and can be a nuisance, such as when water drains from the deck of an upper apartment to an apartment below. It is typical for such a planting pot to be placed on the interior of a larger outer container or pot to contain excess watering liquid that the potting soil cannot contain. The result from this configuration sometimes leads to an over-watering which can virtually drown and kill the plant, or result in root rot, which will have the same effect due to water accumulating in the container or pot.

Bottom watering plant containers are known to offer several advantages over conventional plant containers requiring top watering. For example, there is less loss of water to the surrounding air due to evaporation with bottom watering, and therefore less watering is required to maintain the desired soil moisture levels. Additionally, bottom watering causes less run-off of fertilizers and other soil treatments relative to top watering, resulting in greater retention of fertilizers and other treatments. Various systems have been proposed to allow automatic bottom watering.

Currently there exist various irrigation systems to automatically carry out watering of multiple cultivation pots fluidly connected in series to allow a single source of water from a standard water faucet or a standard garden water hose to provide irrigation water to all of said cultivation pots.

Recent advancements in the art provide a multi-container system comprising a plurality of containers in fluid connection with one another such that the containers may be installed and watered daisy chain style as space limitations permit or as may be desired by the user. The system comprises at least one first container, at least one second container, and at least one third container, each of which has a chamber therein. The first container has a water-retaining chamber with water input and water output as well as a water self-leveling means. The second container has a water transfer chamber in which a wicking tray loaded with a wicking medium is placed, preferably on a drainage tray; said medium being used to transfer the water to the plants is disposed in a third container's plant receiving chamber. The plant receiving chamber nests within the water transfer chamber to receive water therefrom by capillary action. The first container's water-retaining chamber is fluidly connected to the second container for water transfer. However, if there were an elevation change between or among containers, water would more readily flow to the lower containers at the detriment to those on higher ground. Hence, certain plants were overwatered while certain other plants were under watered.

One of the existing plant watering systems includes a multiple plant container self-watering system, which through use of an adjustable wicking system maintains for a plurality of plants a uniform water draw rate despite varying water depths among containers. The invention comprises a primary container and a plurality of secondary containers in fluid connection with one another such that when water is supplied to one container it flows through to all other containers. Gravity ensures water depth remains constant among containers on flat ground, but to offset differences in depth caused by elevation differences among containers, a wick elevator is provided so the wick may be vertically adjusted to the water level. However, the system requires a high degree of user involvement for setup. In an alternate embodiment, flat plates are used to raise a container to the same elevation as the highest container in the place of wick elevators. However, the flat plates contribute an added expense to the system, as well as a hassle of dealing with a large number of flat plates and the high degree of user involvement that accompanies it.

Another existing plant watering system comprises a plurality of tapering plant pots, capable of mounting one upon another in a staggered fashion, to provide a series of stacked planters. A bottom planter is shaped to provide for its accommodations upon a deck rail, or the bottom planter may locate within a tray, even one that contains casters, to provide freedom for movement upon a patio, deck, or other floor. Contained within each of the stackable containers, and also within the bottom planter, is an elevated base, containing perforations, and a series of downwardly depending slotted wells, the latter into which potting soil may be located, for submerging into any water contained within water reservoirs provided within the bottom of each container, or bottom planter, to achieve migration of water upwardly into the potting soil, for irrigation and moisturization of the root system of any planted vegetation. Accumulated water is allowed to drain from the planting pot into one or more planters arranged and stacked therebelow, in order to provide for multiple planter watering, whenever moisture is added to the upper planters, during usage. However, multiple planter watering is provided only when the planters are stacked on top of another and not arranged along a ground surface.

Various other plant-watering systems exist that provide automatic, controlled delivery of water to the root systems of a plurality of plants on a substantially continuous basis. Some systems include water feed pipes and drainpipes connected to a water feed regulator in each plant container connected in series, and one end of the water feed pipe is simultaneously connected to a supply source for water. The water is then periodically fed from the supply source to store a prescribed amount of the water in a water tank in each plant container. Some other systems include an enclosed chamber or tubing with multiple openings and a plurality of improved plant watering devices adapted to be attached to the openings. Some systems supply water to potted plants through feeder conduits fluidly connecting with the lower ends of the plants and leading from a main distribution conduit to which the water is admitted from a water main or other pressurized source. However, all such plant-watering systems are suitable for level ground only and not for sloping or inclined surfaces.

Based on the foregoing, there is a demonstrable need for a plant self-watering system that provides a means for fluidly connected pots that are on a sloped surface to dry down in unison. Such a needed multiple plant container self-watering system would comprise a plurality of fluidly connected units on a sloping surface connected by means of tubing. The plurality of fluidly connected units would include at least one primary container to which an external water supply is connected and a plurality of secondary containers. Each of the containers would comprise an outer shell that encloses a grow pot, a reservoir pot and a wick. Further, the reservoir pot would comprise an expanded upper portion and a tubular lower portion, which would allow all the containers to begin dry down at approximately the same time. Such a needed plant watering system would maintain roughly the same moisture level in the growing media of each of the plurality of units. Finally, the multiple plant container self-watering system would be easy to assemble and would require little to no user involvement. The present invention overcomes prior art shortcomings by accomplishing these critical objectives.

SUMMARY OF THE DISCLOSURE

To minimize the limitations found in the prior art and to minimize other limitations that will be apparent upon the reading of the specifications, the preferred embodiment of the present invention provides a multiple plant container self-watering system for fluidly connected plant containers at different elevations.

The present invention discloses a means for fluidly connected plant containers that are placed on an inclined or sloped surface to dry down in unison. The multiple plant container self-watering system of the present invention maintains the moisture level in the growing media of each of the plurality of plant containers along a sloped patio roughly the same with little or no user involvement.

According to certain embodiments of the present invention, the multiple plant container self-watering system comprises a primary container at a first elevation and a plurality of secondary containers, each at a different elevation than the primary container. The primary container will be at the highest elevation. The primary container and the plurality of secondary containers are fluidly connected by means of tubing. The primary container is fluidly connected to an external water supply and to at least one of the plurality of secondary containers, while the plurality of secondary containers is fluidly connected in daisy-chain style. The number of the plurality of secondary containers may be varied according to the slope of the surface and space limitations.

In accordance with an aspect of the present invention, the primary container comprises a primary outer shell that encloses a primary reservoir pot, a primary grow pot, and a primary wick and has a pair of holes. One of the pair of holes in the primary container is to connect to a water supply and the other of the pair of holes is to receive the tubing from an adjacent secondary container. The primary reservoir pot has an expanded upper portion and a tubular lower portion centered in the middle of the upper portion. The diameter of the lower portion of the primary reservoir pot is greatly reduced in comparison to the diameter of the upper portion thereof and is only large enough to accommodate a diameter of the primary wick. The primary wick rests on a primary platform of the upper portion of the primary reservoir pot and extends down through the lower portion thereof. The primary grow pot, containing soil medium and growing plant, rests on the primary wick and the primary platform of the primary reservoir pot. The primary wick draws water from the primary reservoir pot to a base of the primary grow pot thereby putting water in direct contact with soil medium therein.

In accordance with another aspect of the present invention, each of the plurality of secondary containers comprises a secondary outer shell that encloses a secondary reservoir pot, a secondary grow pot, and a secondary wick and has a pair of holes to receive the tubing from an adjacent secondary container or the primary container. The secondary reservoir pot has an expanded upper portion and a tubular lower portion centered in the middle of the upper portion. The diameter of the lower portion of the secondary reservoir pot is greatly reduced in comparison to the diameter of the upper portion thereof and is only large enough to accommodate the diameter of the secondary wick. The secondary wick rests on a secondary platform of the upper portion of the secondary reservoir pot and extends down through the lower portion thereof. The secondary grow pot rests on the secondary wick and the secondary platform of the secondary reservoir pot. The secondary wick draws water from the secondary reservoir pot to a base of the secondary grow pot thereby putting water in direct contact with soil medium therein.

According to certain embodiments of the present invention, when the primary container reaches the point where it begins to dry down, the water level in the plurality of secondary containers is below the upper expanded portion of the secondary reservoir pot and in the greatly reduced volume of the lower tubular portion. The volume available to water in the lower tubular portion is even less as the majority of space in the lower tubular portion is taken up by the secondary wick. As a result, once the primary container begins to dry down, the remaining secondary containers quickly follow. Thus the moisture level in the growing media of each of the plurality of secondary containers remains roughly the same.

A first objective of the present invention is to provide a multiple plant container self-watering system for plant containers at different elevations.

A second objective of the present invention is to provide a means for fluidly connected plant containers at different elevations to dry down in unison.

A third objective of the present invention is to provide a multiple plant container self-watering system which maintains the moisture level in the growing media of each of the plurality of plant containers at different elevations roughly the same.

A further objective of the present invention is to provide a multiple plant container self-watering system that is scalable according to water input capability and available space.

A final objective of the present invention is to provide a multiple plant container self-watering system that is easy to assemble, highly efficient, and requires little or no user involvement for its functioning.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
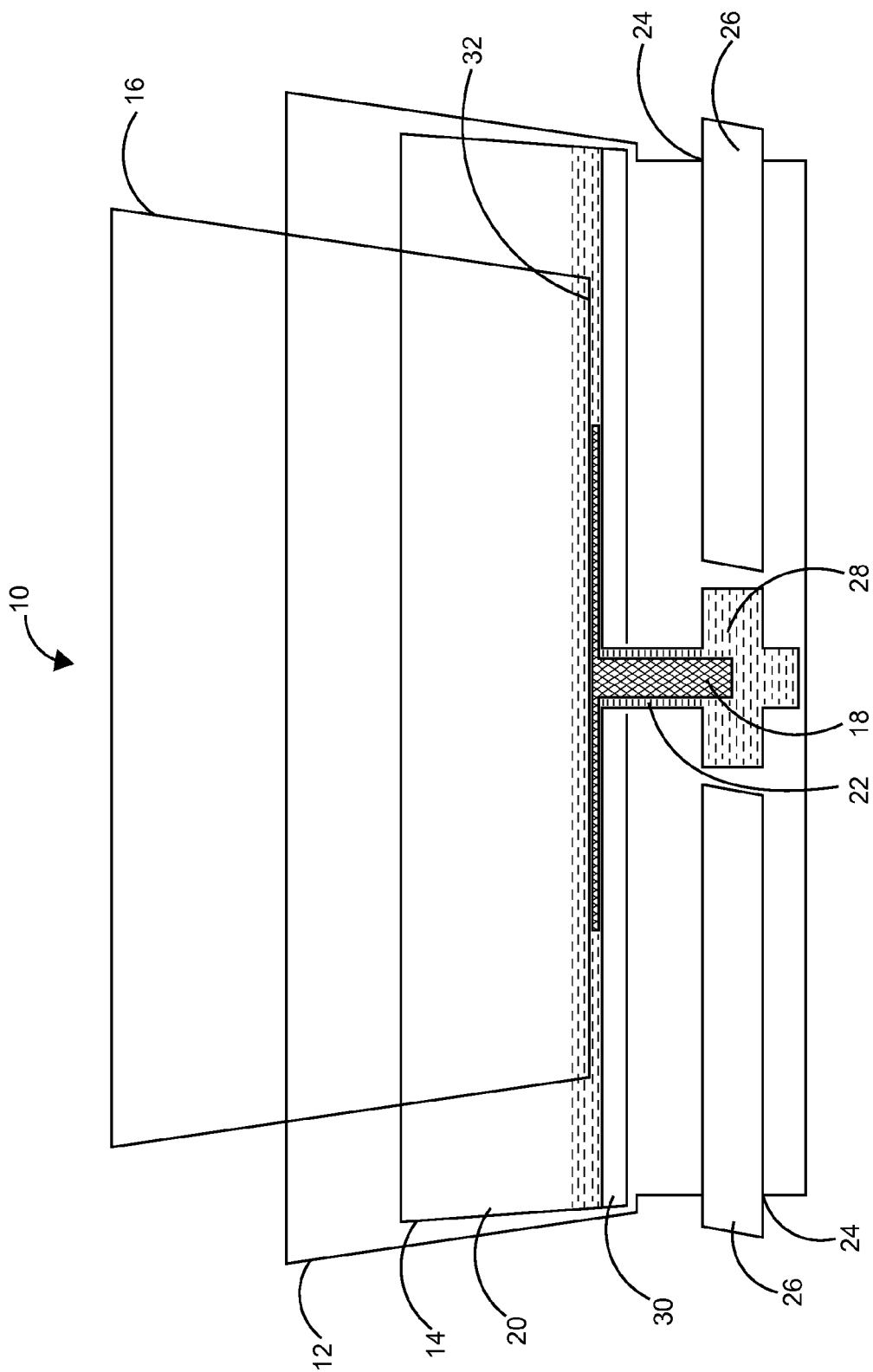
FIG. 1 illustrates a schematic depiction of a plant container for use with a preferred embodiment of a multiple plant container self-watering system.
Figure 2:
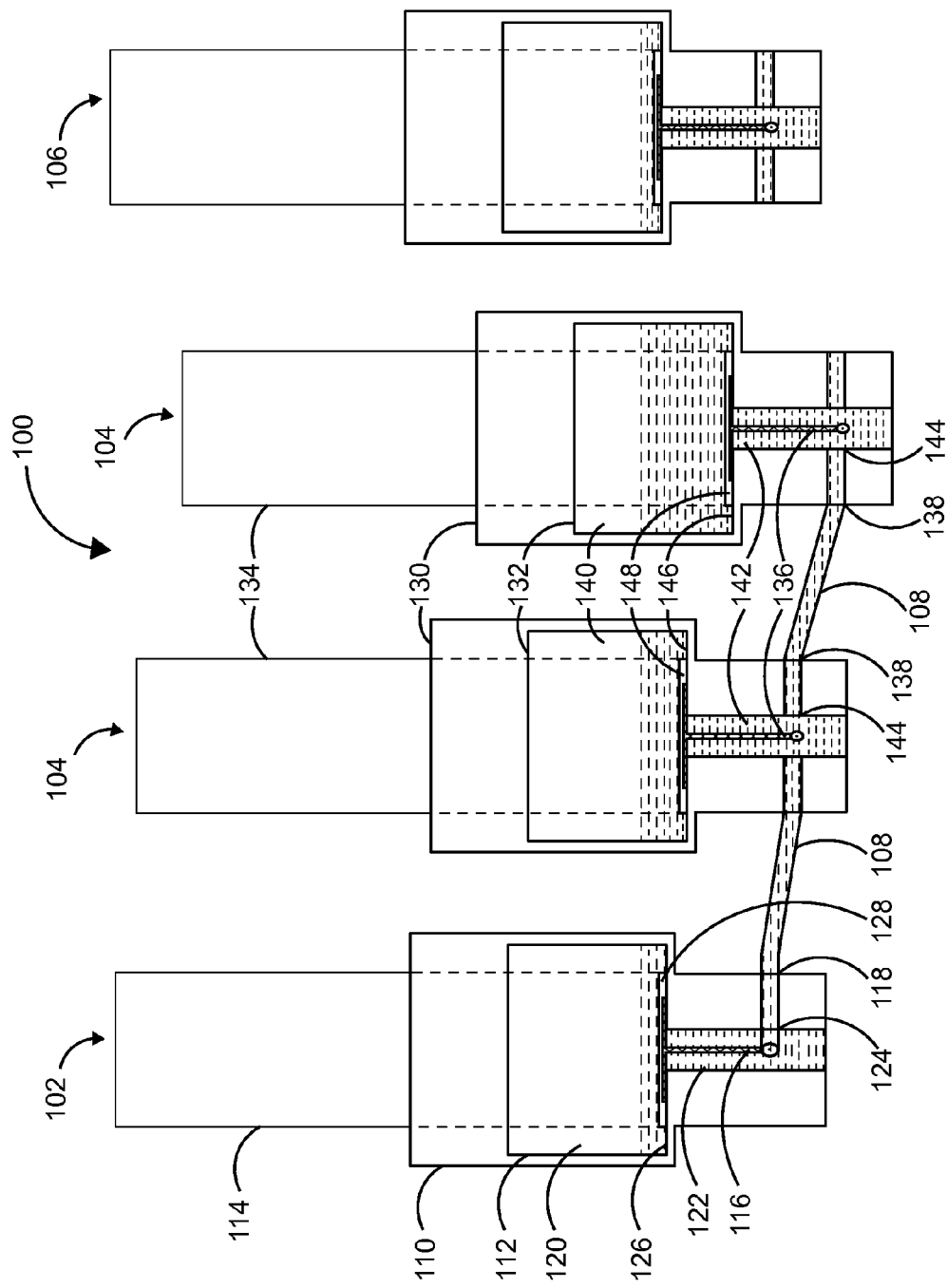
FIG. 2 illustrates a schematic depiction of the preferred embodiment of the multiple plant container self-watering system at high water level.

FIG. 1 illustrates a schematic depiction of a plant container 10 for use with a preferred embodiment of a multiple plant container self-watering system 100 (See FIG. 2). The plant container 10 comprises an outer shell 12, a reservoir pot 14, a grow pot 16, and a wick 18. The outer shell 12 encloses the reservoir pot 14, the grow pot 16, and the wick 18. The reservoir pot 14 has an upper portion 20 and a lower portion 22. The lower portion 22 is centered in the middle of the upper portion 20. A diameter of the lower portion 22 of the reservoir pot 14 is greatly reduced in comparison to a diameter of the upper portion 20 thereof. This structure of the reservoir pot 14 allows for substantially similar dry-down time for a plurality of fluidly connected plant containers 10 at different elevations in a multiple plant container self-watering system 100 (See FIG. 2).

The outer shell 12 does not hold water and has a pair of holes 24 for receiving tubing 26. In a primary container 102 (FIG. 2) of the multiple plant container self-watering system 100 (FIG. 2) one of said pair of holes 24 allows a fluid connection to be made to a water supply and the other hole of said pair of holes 24 is to provide for a fluid connection with adjacent plant containers (See FIG. 2). The main purpose of the outer shell 12 is for aesthetics and to support the reservoir pot 14 and the tubing 26 as it exits through the pair of holes 24 in the sides of the outer shell 12. The reservoir pot 14 contains water. The lower portion 22 of the reservoir pot 14 is tubular in comparison to the expanded upper portion 20 and is centered in the middle of the upper portion 20. The diameter of the lower portion 22 of the reservoir pot 14 is only large enough to accommodate a diameter of the wick 18. The lower portion 22 of the reservoir pot 14 further comprises a means 28 for receiving the tubing 26 from an adjacent plant container (See FIG. 2).

A platform 30 of the upper portion 20 of the reservoir pot 14 supports the grow pot 16 and the wick 18. Plants may be placed within the grow pot 16, which has a water permeable base 32 so that moisture can be wicked upwardly. The upper portion 20 of the reservoir pot 14 allows the water to completely surround the base 32 of the grow pot 16 thereby putting the water in direct contact with the soil medium. The wick 18 draws water from the reservoir pot 14 to the base 32 of the grow pot 16 thereby putting water in direct contact with soil medium therein. The grow pot 16 should be no higher than water can practically move through capillary action.

Figure 3:
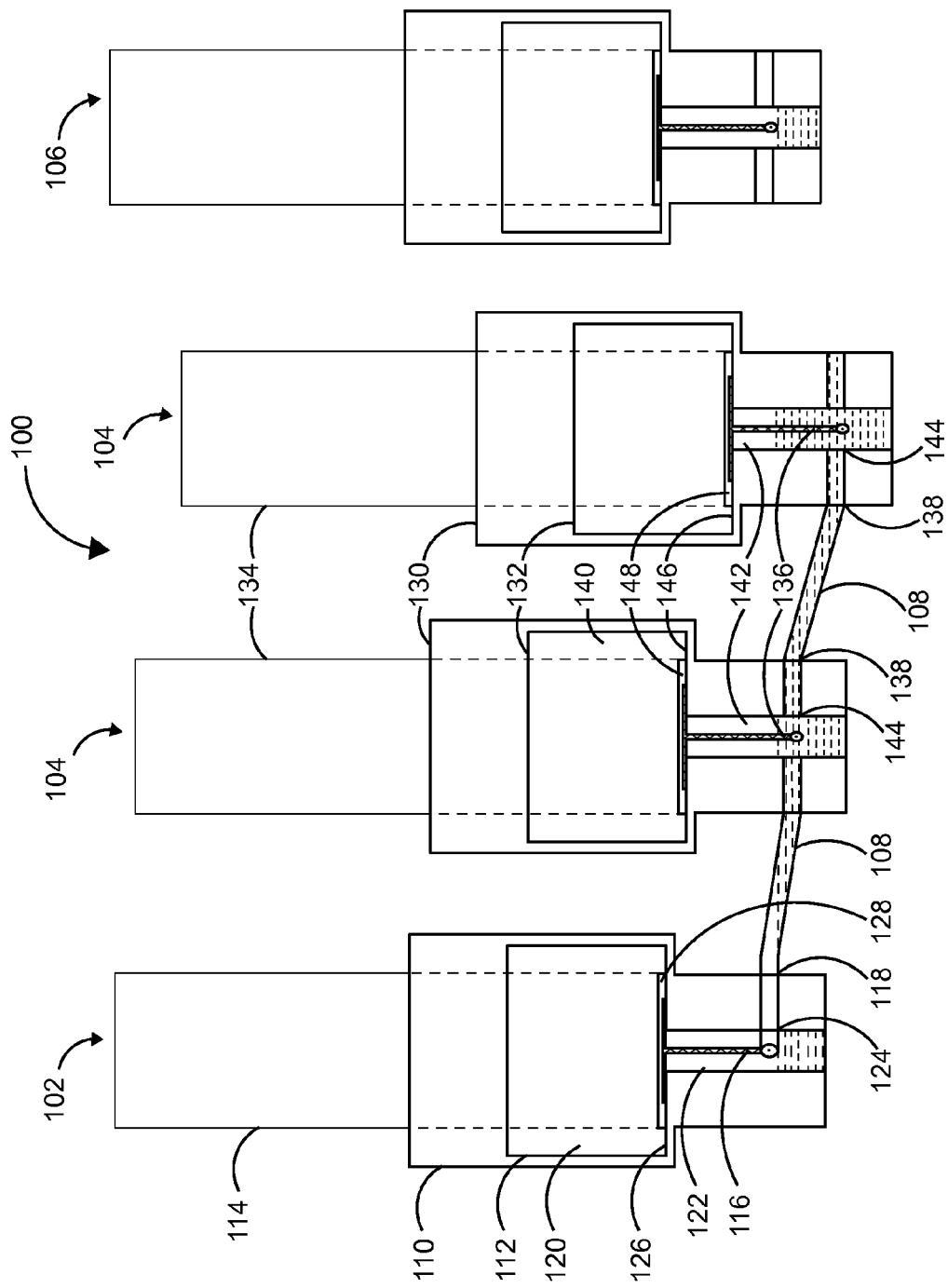
FIG. 3 illustrates a schematic depiction of the preferred embodiment of the multiple plant container self-watering system at the start of dry-down.

Referring to FIGS. 2-3, a schematic depiction of a preferred embodiment of a multiple plant container self-watering system 100 is illustrated. The multiple plant container self-watering system 100 comprises a primary container 102 at a first elevation and a plurality of secondary containers 104, with each of the plurality of secondary containers 104 being at a different elevation. The figure also shows a level container 106 at a reference elevation. The primary container 102 and the plurality of secondary containers 104 are fluidly connected by means of tubing 108 and configured to allow for substantially similar dry-down time. The primary container 102 is fluidly connected to an external water supply (not shown) and to at least one of the plurality of secondary containers 104. The external water supply may be a hose bib, and for automatic watering, a timer and ball valve (not shown) could be connected to the supply line. The plurality of secondary containers 104 is fluidly connected in daisy-chain style.

The primary container 102 comprises a primary outer shell 110, a primary reservoir pot 112, a primary grow pot 114, and a primary wick 116. The primary outer shell 110 encloses the primary reservoir pot 112, the primary grow pot 114, and the primary wick 116 and has a pair of holes 118, one of which is connected to a water supply and the other of which is to receive the tubing 108 from an adjacent secondary container 104. The primary outer shell 110 supports the primary reservoir pot 112 and the tubing 108 as it exits through the pair of holes 118 in the sides of the primary outer shell 110.

The primary reservoir pot 112 has an upper portion 120 and a lower portion 122. The lower portion 122 of the primary reservoir pot 112 is tubular in comparison to the expanded upper portion 120 and is centered in the middle of the upper portion 120. The diameter of the lower portion 122 of the primary reservoir pot 112 is greatly reduced in comparison to the diameter of the upper portion 120 thereof. The diameter of the lower portion 122 of the primary reservoir pot 112 is only large enough to accommodate the diameter of the primary wick 116. The lower portion 122 of the primary reservoir pot 112 further comprises a means 124 for receiving the tubing 108 from an adjacent secondary container 104.

The primary wick 116 is basically T-shaped in structure and rests on a primary platform 126 of the upper portion 120 of the primary reservoir pot 112 and extends down through the lower portion 122 thereof. The primary grow pot 114 rests on the primary wick 116 and the primary platform 126 of the primary reservoir pot 112. Plants may be placed within the primary grow pot 114, which has a water permeable base 128 so that moisture can be wicked upwardly. The primary wick 116 draws water from the primary reservoir pot 112 to the base 128 of the primary grow pot 114 thereby putting water in direct contact with soil medium therein.

A float gauge (not shown) is incorporated into the primary container 102 to show the water level. To prevent oversaturation of the soil medium during rainy periods, an overflow port (not shown) may be added in the upper portion 120 of the primary reservoir pot 112, which would be situated near the elevation of the base 128 of the primary grow pot 114. A plug (not shown) for the overflow port may also be added if the user desired the water level to go above the level of the overflow port.

Each of the plurality of secondary containers 104 comprises a secondary outer shell 130, a secondary reservoir pot 132, a secondary grow pot 134, and a secondary wick 136. The secondary outer shell 130 encloses the secondary reservoir pot 132, the secondary grow pot 134, and the secondary wick 136 and has a pair of holes 138 to receive the tubing 108 from an adjacent secondary container 104 or the primary container 102. The secondary outer shell 130 supports the secondary reservoir pot 132 and the tubing 108 as it exits through the pair of holes 138 in the sides of the secondary outer shell 130.

The secondary reservoir pot 132 has an upper portion 140 and a lower portion 142. The lower portion 142 of the secondary reservoir pot 132 is tubular in comparison to the expanded upper portion 140 and is centered in the middle of the upper portion 140. The diameter of the lower portion 142 of the secondary reservoir pot 132 is greatly reduced in comparison to the diameter of the upper portion 140 thereof. The diameter of the lower portion 142 of the secondary reservoir pot 132 is only large enough to accommodate the diameter of the secondary wick 136. The lower portion 142 of the secondary reservoir pot 132 further comprises a means 144 for receiving the tubing 108 from an adjacent secondary container 104 or the primary container 102.

The secondary wick 136 is basically T-shaped in structure and rests on a secondary platform 146 of the upper portion 140 of the secondary reservoir pot 132 and extends down through the lower portion 142 thereof. The secondary grow pot 134 rests on the secondary wick 136 and the secondary platform 146 of the secondary reservoir pot 132. Plants may be placed within the secondary grow pot 134 which has a water permeable base 148 so that moisture can be wicked upwardly. The secondary wick 136 draws water from the secondary reservoir pot 132 to the base 148 of the secondary grow pot 134 thereby putting water in direct contact with soil medium therein.

The multiple plant container self-watering system 100 of the present invention provides a means for a plurality of fluidly connected containers 102, 104 that dry down in unison on a sloped surface. In the preferred embodiment, the number of the plurality of fluidly connected containers 102, 104 is limited to three, i.e. one primary container 102 and two secondary containers 104. The primary container 102 will be at the highest elevation. The number of the plurality of secondary containers 104 may be varied according to the slope of the surface and space limitations.

Turning to FIG. 2, a schematic depiction of the preferred embodiment of the multiple plant container self-watering system 100 at high water level is illustrated. On a patio with a slope of ¼ of an inch per foot, the plurality of containers 102, 104 are spaced a reasonable distance apart such that, the elevation of the lowest secondary container 104 is no more than ¾ of an inch lower than the primary container 102. As a result, on a slope if the water level is even with the base 128 of the primary grow pot 114 in the primary container 102, then the water level will be about ¾ of an inch above the base 148 of the secondary grow pot 134 in the lowest secondary container 104. The upper portion 120, 140 of the reservoir pot 112, 132 allows the water to completely surround the base 128, 148 of the grow pot 114, 134 and puts the water in direct contact with the growing medium such that it is quickly wicked into the soil.

One of the main benefits of the present invention is that it facilitates the control of alternating wet and dry cycles. It is beneficial to most plants to have wet (saturated) periods alternating with dry periods. The multiple plant container self-watering system 100 achieves this through control over the water level in relation to the wicks. Once the primary container 102 has been filled to the high water level as shown in FIG. 2, the water supply to the primary container 102 may be shut off manually or by a timer. By observing the height of the float gauge (not shown) in the primary container 102, the user will know when the high water level has been achieved. Water will move by capillary action from the reservoir pot 112, 132 into the soil medium within the grow pot 114, 134 until the soil reaches field capacity. As water is consumed by the plant and lost due to evapotranspiration, it will continue to be wicked up from the reservoir pot 112, 132, maintaining the soil medium at field capacity. The water level will lower to the low water level, which is the level where the primary wick 116 is no longer in contact with the water in the reservoir pot 112; the soil medium of the primary container 102 will begin to dry down.

Turning to FIG. 3, a schematic depiction of the preferred embodiment of the multiple plant container self-watering system 100 at the start of dry down is illustrated. When the primary container 102 reaches the point where it begins to dry down i.e. the point where the primary wick 116 is no longer in contact with the water in the primary reservoir pot 112, the water level in the plurality of secondary containers 104 is below the upper expanded portion 140 of the secondary reservoir pot 132 and in the greatly reduced volume of the lower tubular portion 142. The volume available to water in the lower tubular portion 142 is even less as the majority of space in the lower tubular portion 142 is taken up by the secondary wick 136. As a result, once the primary container 102 begins to dry down, the remaining secondary containers 104 quickly follow. Thus, the moisture level in the growing media of each of the plurality of secondary containers 104 remains roughly the same.

Once the fluid connection to all containers 102, 104 and plants is broken, water may eventually need to be reintroduced to the system 100. By observing the height of the float gauge (not shown) in the primary container 102, the user will know when the low water level has been achieved. The user can adjust the length of dry down time as necessary. Water may also be reintroduced to the system 100 automatically through the timer.

A layer of ground cloth or some type of root inhibitor fabric (not shown) may be incorporated in between the base 128, 148 of the grow pot 114, 134 and the wick 116, 136 to prevent roots from entering the wick 116, 136 and the tubing 108. It would also be useful if the fabric covered the entire surface of the reservoir platform 126, 146 thereby keeping debris from entering the tubing 108. Further, there may be a means for keeping the edges of the fabric flat against the platform 126, 146, such as a plastic ring, so that debris cannot go underneath the fabric and enter the system 100. In some cases, water may be applied to the top surface of the soil media in the grow pot 114, 134 through a drip system.

Figure 5:
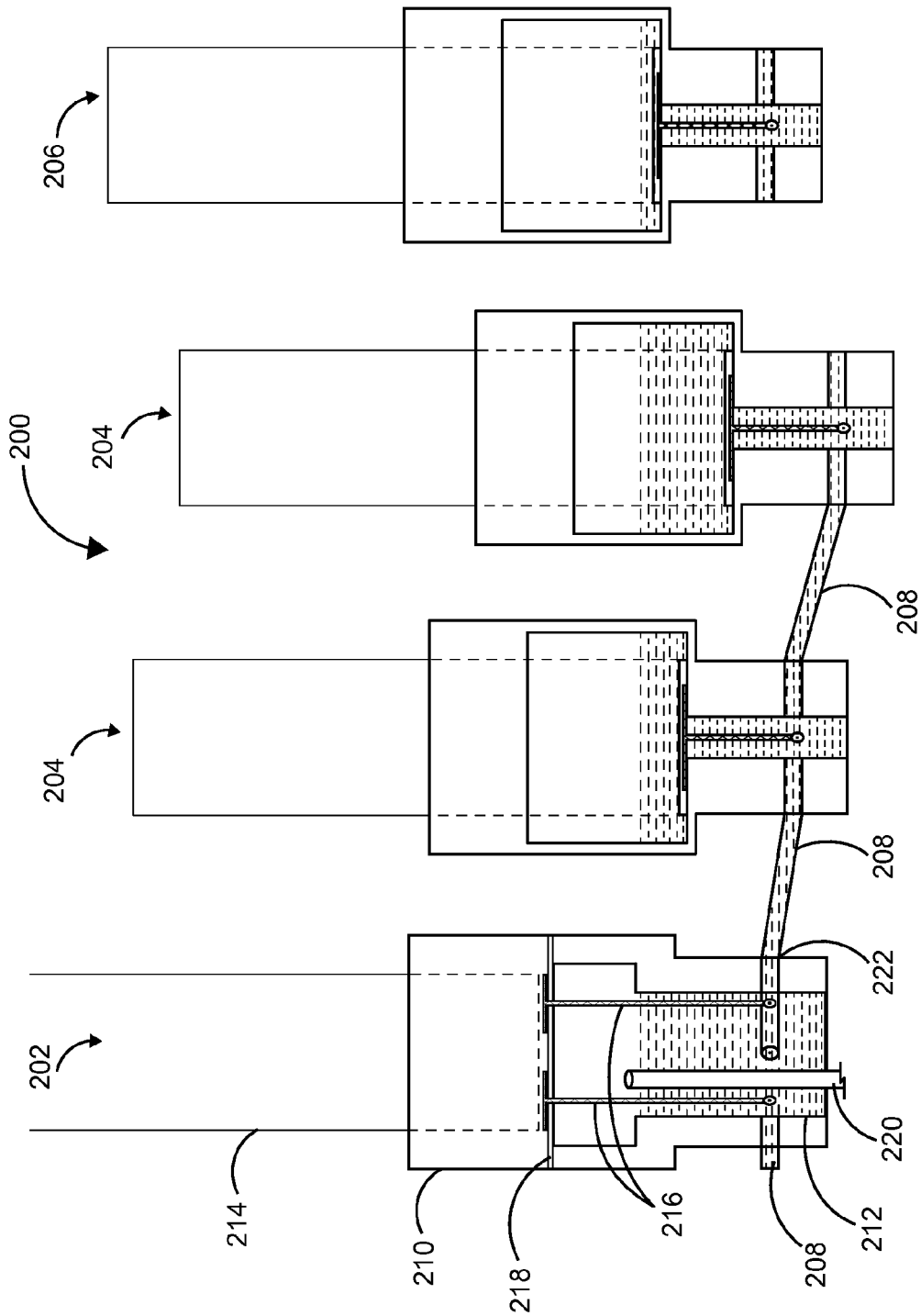
FIG. 5 illustrates a schematic depiction of the alternate embodiment of the multiple plant container self-watering system at high water level.
Figure 6:
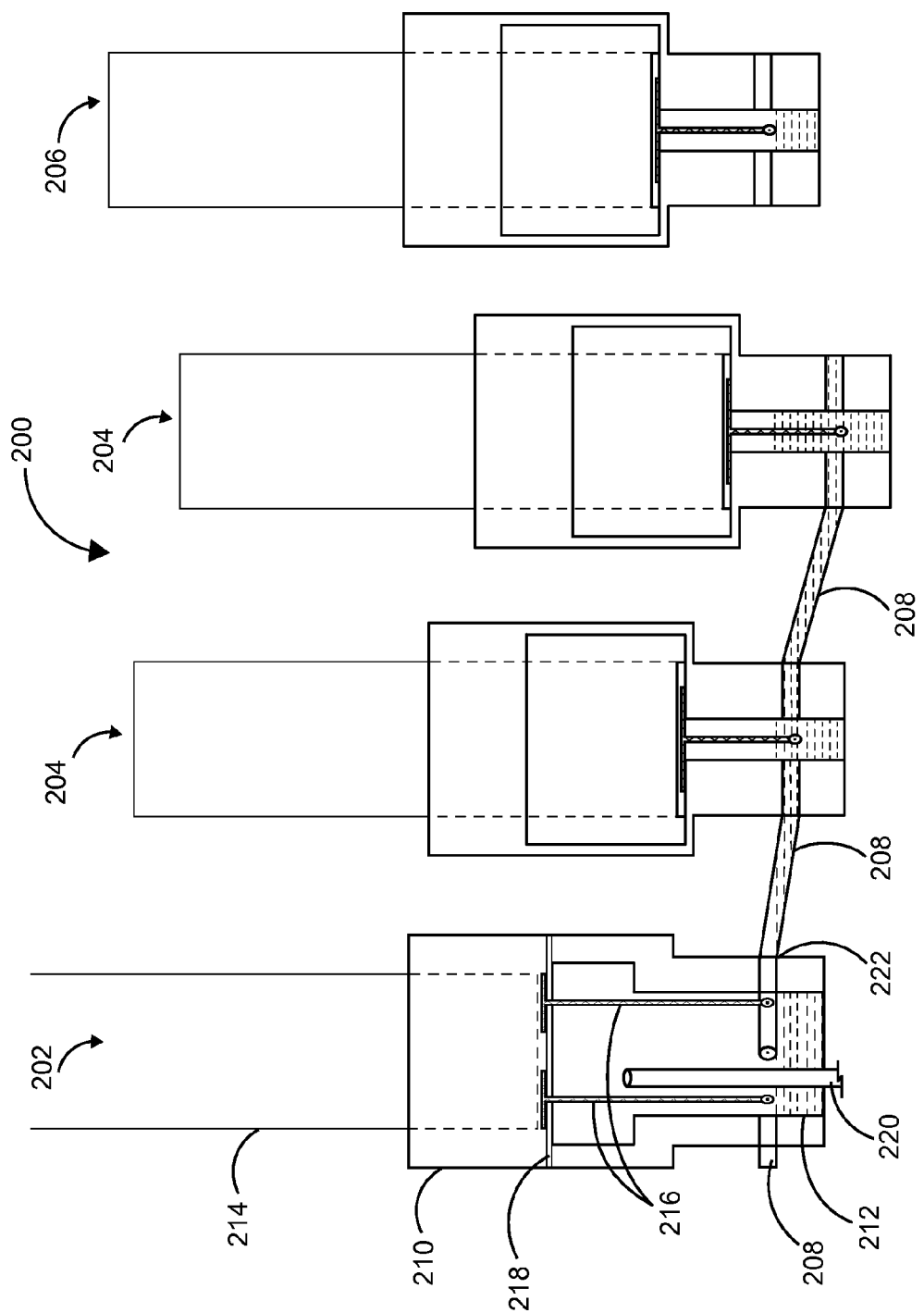
FIG. 6 illustrates a schematic depiction of the alternate embodiment of the multiple plant container self-watering system at the start of dry-down.

Referring to FIGS. 5-6, a schematic depiction of an alternate embodiment of the multiple plant container self-watering system 200 is illustrated. The multiple plant container self-watering system 200 comprises a primary container 202 at a first elevation and a plurality of secondary containers 204, each of the plurality of secondary containers 204 being at a different elevation. The figure also shows a level container 206 at a reference elevation. The primary container 202 and the plurality of secondary containers 204 are fluidly connected by means of tubing 208 and configured to allow for substantially similar dry-down time. The primary container 202 is fluidly connected to an external water supply by means of a hose 220 and to at least one of the plurality of secondary containers 204. The plurality of secondary containers 204 is fluidly connected in daisy-chain style.

Figure 4:
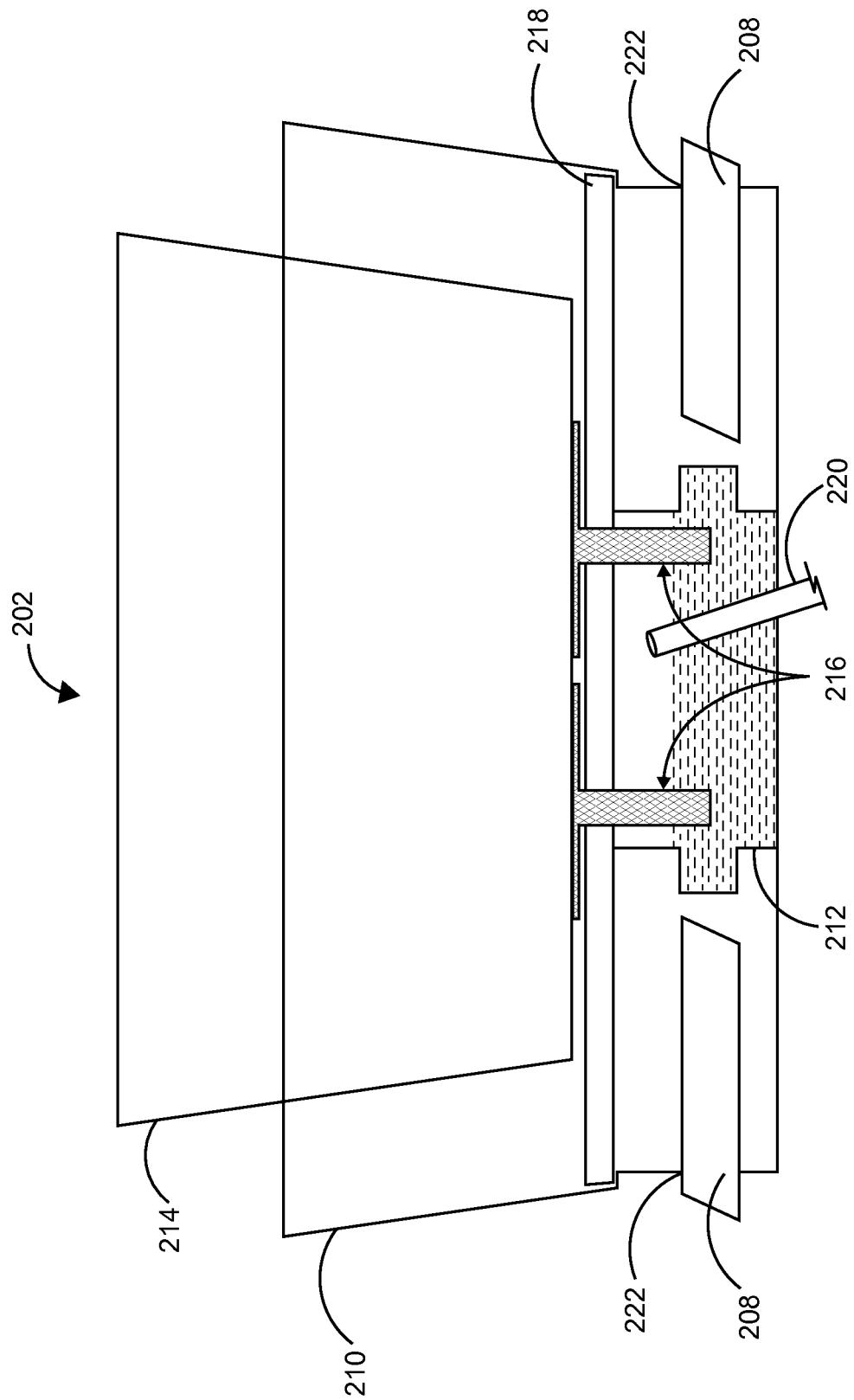
FIG. 4 illustrates a schematic depiction of a primary container for use with an alternate embodiment of the multiple plant container self-watering system.

Turning to FIG. 4, a schematic depiction of the primary container 202 of the multiple plant container self-watering system 200 is illustrated. The primary container 202 comprises a primary outer shell 210 that encloses a primary reservoir pot 212, a primary grow pot 214 and a primary wick 216. The primary wick 216 is held by a support structure platform 218. The primary outer shell 210 supports the support structure platform 218 that supports the primary grow pot 214 above the primary wick 216. The primary outer shell 210 has a pair of holes 222 to receive the tubing 208 from an adjacent secondary container 204. A standard float valve (not shown) is incorporated into the primary container 202 to control the water level in the primary reservoir 212. The use of the hose 220 for constant input of water to the primary container 202 will ensure uninterrupted operation of the system 200. The float valve limits the amount of water coming in from the external water supply into the primary container 202, and thus also limits the rise of water in the primary container 202 and the secondary containers 204.

The preferred embodiment of the multiple plant container self-watering system 100 may be modified in various ways to improve performance. In one embodiment, the outer shell 110, 130 may be eliminated, and a plastic or metal frame (circle or square) may be used in its place. The frame may be adjustable in height to raise the container 102, 104 if desired. The frame may also be extended in length to enable it to hold more than one grow pot 114, 134. Further, the frame could support the grow pots 114, 134 in such a manner that there is no contact with the ground making it easy to move the grow pots 114, 134 along the frame. This would make it possible to economically offer various sizes of the reservoir pot 112, 132 to consumers, which would enable the consumers to use various sizes of grow pots 114, 134 or to change the size of the reservoir pot 112, 132 in relation to the size of the grow pot 114, 134 used.

In another embodiment, the lower portion 122, 142 of the reservoir pot 112, 132 may run the length (or diameter) of the platform 126, 146 of the upper portion 120, 140, with the wick 116, 136 also running the length of the platform 126, 146. This would be useful if more than one grow pot 114, 134 were placed on the platform 126, 146 or if the length of the platform 126, 146 were increased to accommodate a much larger grow pot 114, 134 such as a planter box. In some other embodiments, the height of the side of the reservoir pot 112, 132 may be extended so that it forms a lip over the top rim of the outer shell 110, 130. The grow pot 114, 134 may have an extension on its base 128, 148 that houses the wick 116, 136 and extends into the lower portion 122, 142 of the reservoir pot 112, 132.

In some alternate embodiments, a portion of the side of the reservoir pot 112, 132 may bulge outward to facilitate pouring water between the reservoir pot 112, 132 and the grow pot 114, 134. A float gauge assembly (not shown) may be fitted into the bulge so that the user may easily see the water level. Further, the platform 126, 146 of the reservoir pot 112, 132 may have drainage channels (not shown) to facilitate water movement and to allow air to reach the base 128, 148 of the grow pot 114, 134. In the preferred embodiment the platform configuration in the primary container is the same as that in a secondary container while in the alternate embodiment the platform configuration in the primary container is different from that in secondary containers.

The present invention 100 provides each plant with access to a common pool of water with a common high water level and low water level. The present invention 100 also prevents the occurrence of overly saturated soil and under watering. Since water is supplied to the soil by means of capillary action, the water content of the vast majority of the soil does not exceed the field capacity of the soil, i.e. the point where water no longer drains from the soil due to gravity. Under watering is more likely to be avoided because of the reservoir access provided for each plant. Materials such as hard plastic and stainless steel may be used as well as containers made from breathable materials, but at a greater financial cost.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A multiple plant container self-watering system comprising:
   a primary container at a first elevation, the primary container comprising:
      a primary outer shell having a pair of holes to receive tubing;
      a primary reservoir pot located inside the primary outer shell, the primary reservoir pot having an upper portion and a lower portion, the lower portion having a tubular configuration and centered in the middle of the upper portion;
      a primary platform positioned above the lower portion of the primary reservoir pot;
      a primary wick resting on the primary platform and extending down through the lower portion of the primary reservoir pot; and a primary grow pot resting on the primary wick and the primary platform of the primary reservoir pot; and a plurality of secondary containers, each of the plurality of secondary containers being at a different elevation and comprising:
- a secondary outer shell having a pair of holes to receive the tubing;
- a secondary reservoir pot located inside the secondary outer shell, the secondary reservoir pot having an upper portion and a lower portion, the lower portion having a tubular configuration and centered in the middle of the upper portion;
- a secondary platform positioned above the lower portion of the secondary reservoir pot;
- a secondary wick resting on the secondary platform and extending down through the lower portion of the secondary reservoir pot; and
- a secondary grow pot resting on the secondary wick and the secondary platform of the secondary reservoir pot;

whereby the primary container and the plurality of secondary containers are fluidly connected by means of the tubing and configured to allow for substantially similar dry-down time.

2. The multiple plant container self-watering system of claim 1 wherein the primary container is fluidly connected to an external water supply and to at least one of the plurality of secondary containers.

3. The multiple plant container self-watering system of claim 1 wherein the plurality of secondary containers is fluidly connected in daisy-chain style.

4. The multiple plant container self-watering system of claim 1 wherein the primary outer shell supports the primary reservoir pot and the tubing.

5. The multiple plant container self-watering system of claim 1 wherein the secondary outer shell supports the secondary reservoir pot and the tubing.

6. The multiple plant container self-watering system of claim 1 wherein the lower portion of the primary reservoir pot comprises a means for receiving the tubing from an adjacent container.

7. The multiple plant container self-watering system of claim 1 wherein the lower portion of the secondary reservoir pot comprises a means for receiving the tubing from an adjacent container.

8. The multiple plant container self-watering system of claim 1 wherein the lower portion of the primary reservoir pot has a diameter that is greatly reduced in comparison to a diameter of the upper portion thereof.

9. The multiple plant container self-watering system of claim 1 wherein the lower portion of the primary reservoir pot has a diameter that is only large enough to accommodate a diameter of the primary wick.

10. The multiple plant container self-watering system of claim 1 wherein the lower portion of the secondary reservoir pot has a diameter that is greatly reduced in comparison to a diameter of the upper portion thereof.

11. The multiple plant container self-watering system of claim 1 wherein the lower portion of the secondary reservoir pot has a diameter that is only large enough to accommodate a diameter of the secondary wick.

12. The multiple plant container self-watering system of claim 1 wherein the primary wick is T-shaped in structure and draws water upwardly from the primary reservoir pot to a base of the primary grow pot thereby putting water in direct contact with soil medium.

13. The multiple plant container self-watering system of claim 1 wherein the secondary wick is T-shaped in structure and draws water upwardly from the secondary reservoir pot to a base of the secondary grow pot thereby putting water in direct contact with soil medium.

14. A multiple plant container self-watering system comprising:
a primary container at a first elevation, the primary container comprising:
- a primary outer shell;
- a primary reservoir pot located inside the primary outer shell, having an upper portion and a lower portion in a tubular configuration and centered in the middle thereof, the lower portion having a diameter greatly reduced in comparison to a diameter of the upper portion;
- primary platform positioned above the lower portion of the primary reservoir pot;
- a primary wick resting on the primary platform and extending down through the lower portion of the primary reservoir pot, the primary wick being substantially T-shaped in structure and drawing water upwardly from the primary reservoir pot to a base of the primary grow pot thereby putting water in direct contact with soil medium; and
- a primary grow pot resting on the primary wick and the primary platform of the primary reservoir pot; and a plurality of secondary containers, each of the plurality of secondary containers being at a different elevation and comprising:
- a secondary outer shell;
- a secondary reservoir pot located inside the secondary outer shell having an upper portion and a lower portion in a tubular configuration and centered in the middle thereof, the lower portion having a diameter greatly reduced in comparison to a diameter of the upper portion;
- a secondary platform positioned above the lower portion of the secondary reservoir pot;
- a secondary wick resting on the secondary platform and extending down through the lower portion of the secondary reservoir pot, the secondary wick being substantially T-shaped in structure and drawing water upwardly from the secondary reservoir pot to a base of the secondary grow pot thereby putting water in direct contact with soil medium; and
- a secondary grow pot resting on the secondary wick and the secondary platform of the secondary reservoir pot;

whereby the primary container and the plurality of secondary containers are fluidly connected by means of tubing and configured to allow for substantially similar dry-down time.

15. The multiple plant container self-watering system of claim 14 wherein the primary outer shell and the secondary outer shell support the primary reservoir pot and the secondary reservoir pot respectively.

16. The multiple plant container self-watering system of claim 14 wherein the lower portion of the primary reservoir pot a the diameter that is only large enough to accommodate a diameter of the primary wick.

17. The multiple plant container self-watering system of claim 14 wherein the lower portion of the secondary reservoir pot has a diameter that is only large enough to accommodate a diameter of the secondary wick.

18. The multiple plant container self-watering system of claim 14 wherein the primary platform of the upper portion of the primary reservoir pot supports the primary grow pot and the primary wick.

19. The multiple plant container self-watering system of claim 14 wherein the secondary platform of the upper portion of the secondary reservoir pot supports the secondary grow pot and the secondary wick.

\* \* \* \* \*